(12) United States Patent
Johnson, Jr. et al.

(10) Patent No.: US 6,381,477 B1
(45) Date of Patent: Apr. 30, 2002

(54) METHOD AND APPARATUS FOR PROTECTING A CIRCUIT MODULE IN A COMMUNICATION DEVICE

(75) Inventors: Robert M. Johnson, Jr., Lake Zurich; Peter McMahan, Gurnee, both of IL (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/434,750

(22) Filed: Nov. 5, 1999

(51) Int. Cl.$^7$ ............................................... H04B 1/38
(52) U.S. Cl. ..................... 455/572; 455/558; 455/573; 379/322; 379/331
(58) Field of Search ........................... 455/558, 572, 455/573; 379/322, 323, 324, 329, 330, 331

(56) References Cited

U.S. PATENT DOCUMENTS

| | | |
|---|---|---|
| 5,771,471 A | 6/1998 | Alberth, Jr. et al. |
| 5,802,151 A * | 9/1998 | Bevill, Jr. et al. ......... 379/93.05 |
| 6,157,316 A * | 12/2000 | Okayama et al. ...... 340/825.44 |
| 6,167,289 A * | 12/2000 | Ball et al. .................... 455/572 |
| 6,256,520 B1 * | 7/2001 | Suzuki ......................... 455/572 |

FOREIGN PATENT DOCUMENTS

| | | |
|---|---|---|
| GB | 2242793 | 10/1991 |
| GB | 2285188 | 6/1995 |
| GB | 2285717 | 7/1995 |
| GB | 2288292 | 10/1995 |

* cited by examiner

*Primary Examiner*—Daniel Hunter
*Assistant Examiner*—Tuan Tran
(74) *Attorney, Agent, or Firm*—Brian M. Mancini

(57) ABSTRACT

A method for protecting a circuit module in a communication device includes first detecting whether a circuit module is present in the communication device. A next step includes measuring a supply voltage to the communication device. A next step includes comparing the supply voltage to a predetermined threshold voltage. When the supply voltage is below the threshold, a next step includes supplying normal functionality to the phone and returning to the comparing step. However, when the supply voltage is above the threshold, a next step includes powering down a connection to the SIM card to limit functionality of the communication device.

17 Claims, 3 Drawing Sheets

METHOD AND APPARATUS FOR PROTECTING A CIRCUIT MODULE IN A COMMUNICATION DEVICE

FIELD OF THE INVENTION

Generally, this invention relates to communication devices which use subscriber identification module (SIM) cards for identification purposes, and more specifically, to a method and apparatus for protecting a SIM card.

BACKGROUND OF THE INVENTION

In current communication device systems such as the Global System for Mobile Communications (GSM) radiotelephone system currently in use in Europe, a SIM card is inserted into a radiotelephone for providing subscriber identification, billing information and other information concerning the operation of the communication device. In the GSM system, the same hardware can be used with any SIM card inserted into the SIM card reader of the radiotelephone.

SIM cards are susceptible to a latch-up condition that can destroy the information in the card. Latch-up can occur when a SIM card is inappropriately powered. This can cause input diode protection for the SIM card circuitry to latch in a conductive state, drawing excessive current and eventually destroying the circuit and the information therein. Therefore, the radiotelephone must know when it can power the SIM card so as to keep it from latching up and being destroyed. Previous methods to prevent destruction of the SIM card have involved additional hardware in the radiotelephone.

One previous method included a mechanical switch to detect the presence of the SIM card. However, this method is unreliable due to mechanical bounce problems and the requirement of good, repeatable alignment of the SIM card in the radiotelephone.

Another previous method involved placing the SIM card beneath the battery of the radiotelephone so that the SIM card is installed before the battery. In addition, the presence of the battery was detected by checking for the presence of a battery thermistor. This method requires the use of more expensive, custom battery modules having a thermistor instead of off-the-shelf batteries.

A third method of detection involved the use of an electrical switch to disconnect the battery from the B+rail of the radiotelephone when an alternate power source is present. The disadvantage here is the added cost due to not only the switch but also the alternate power source. Further the alternate power source must be regulated to prevent damage the phone. An unregulated power source cannot operate the radiotelephone without risk to the other phone circuits.

It would be of benefit to provide an apparatus and method to detect those times during which it is safe to power the SIM card in a communication device. Further, it is desirable to provide this protection without any additional hardware or cost. Additionally, the acceptance of an unregulated external power source would be beneficial. It would also be useful if the power protection provided to prevent latch up of the SIM could also be used to prevent tampering with the SIM card while the communication device is operating.

DETAILED DESCRIPTION OF A PREFERRED EMBODIMENT

The present invention provides an apparatus and method to detect those times during which it is safe to power the SIM card, or any other electronic module that is susceptible to destructive latch-up. For example, smart cards may also be susceptible to a latch up condition. The latch-up protection of the present invention is accomplished without any additional hardware or cost. Additionally, the present invention readily accepts power from an unregulated external power source. Further, power protection provided to prevent latch up of the SIM could also prevent tampering with the SIM card while the communication device is operating. The above advantages are accomplished with the use of existing loose battery cells without additional electrical parts or a regulated power supply. In this way, cost is minimized.

Figure 1:
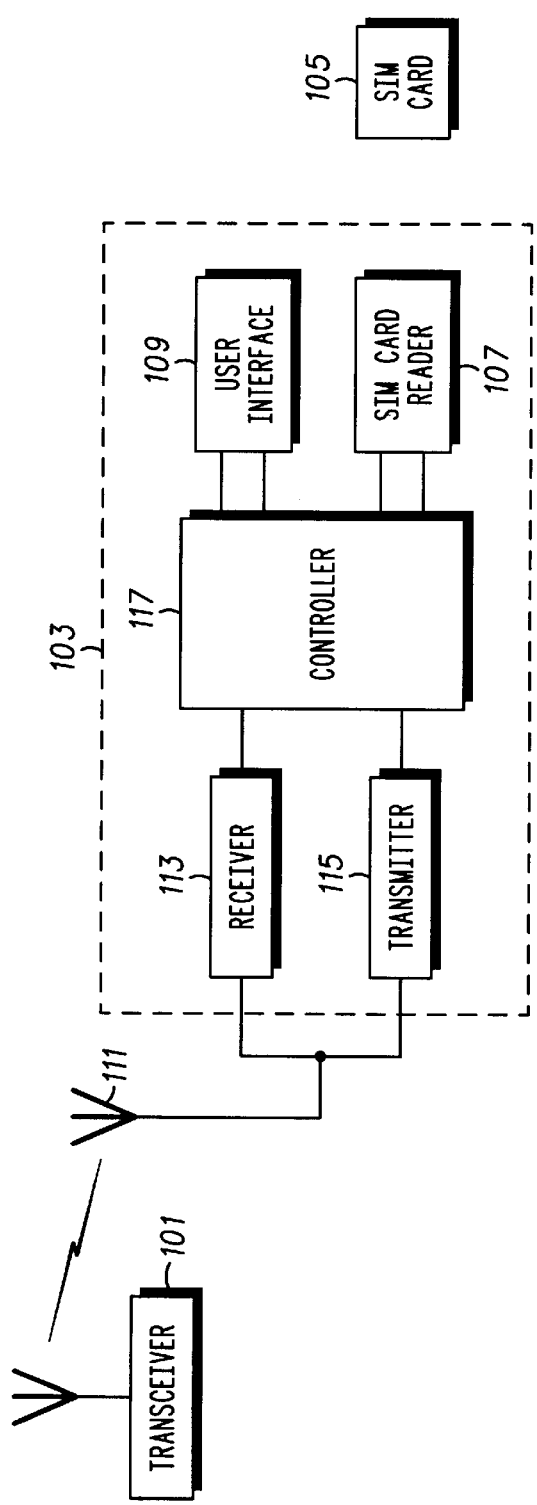
FIG. 1 is an illustration in block diagram form of a communication system, in accordance with the present invention.
Figure 2:
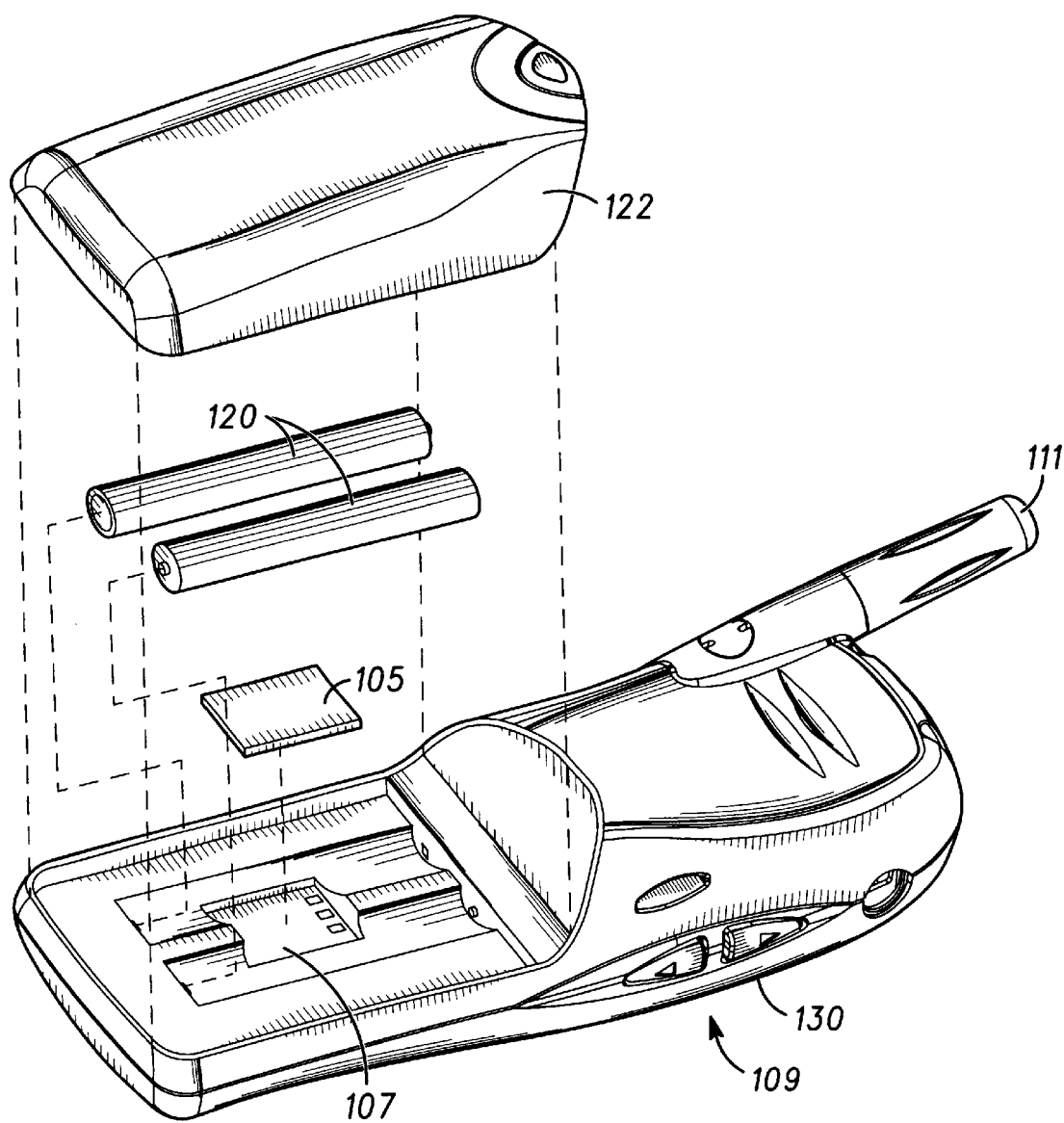
FIG. 2 is an exploded perspective view of the communication device of FIG. 1.

FIGS. 1–2 illustration a communication system, such as a radiotelephone system, in accordance with the present invention. In the communication system, a remote transceiver 101 sends and receives radio frequency (RF) signals to and from mobile and portable radiotelephones within a fixed geographic area served by the remote transceiver 101. Radiotelephone 103 is one such communication device served by the remote transceiver 101.

Before power-up of the communication device 103, a SIM card 105, or other electronic module susceptible to latch up, 105 is inserted into a card reader 107 contained within the communication device 103. This can be done by a field service technician or an end user. Subsequently, at least one battery 120 is inserted covering the SIM card 105 such that the SIM card 105 can not be tampered with after installation of the at least one battery 120. Upon turn-on, the communication device 103 prompts the user through the user interface 109 (e.g. display) to insert a personal identification number (PIN) to unlock the SIM card allowing access to the subscriber information contained therein. In other embodiments, the SIM card may not require the entry of a PIN number to unlock the subscriber information contained therein. After successfully completing the process 200, a communication device 103 is fully registered for service in the communication device system 100 of FIG. 1. The communication device 103 is now able to send and receive RF signals from the remote transceiver 101.

While receiving RF signals from the remote transceiver 101, the communication device 103 uses the antenna 111 to couple the RF signals and to convert the RF signals into electrical RF signals. The electrical RF signals are received by the radio receiver 1 13 for use within a communication device 103. The receiver 113 demodulates the received electrical RF signals and outputs a symbol signal for use by the controller 117. The controller 117 formats the symbol signal into voice for data for use by the user interface 109. The controller 117 includes a microprocessor, such as those commonly available from Motorola, Inc., and memory devices such as RAM and EEPROM. The user interface 109 is used to convey information between a user and the communication device 103, typically including a microphone, a speaker, a display, a data port and a keypad.

Upon the transmission of RF signals from the portable communication device 103 to the remote transceiver 101, the voice and/or data signals from the user interface 109 are processed by the controller 117. The processed signals are input into the transmitter 115. The transmitter 115 converts the data into electrical RF signals. The electrical RF signals are converted into RF signals and output by the antenna 111. The RF signals are received by the remote transceiver 101 and converted for use with a land line telephone system.

Preliminarily, the SIM card is installed followed by the installation of the battery or batteries. It is not necessary that special batteries be used. For example, commonly available "AA" or "AAA" alkaline batteries can be used since thermistor detection is not required. Alternative battery technologies, such as nickel cadmium, nickel metal hydride or lithium batteries, could also be used equally well. Advantageously, the present invention allows the use of loose battery cells instead of more expensive custom battery modules.

Preferably, the SIM card 105 is located under the batteries 120 of the communication device 103. It should be recognized that the SIM card itself can take on various configurations known in the art, such as a smart card, without affecting the operability of the present invention. With the batteries 120 present, the communication device 103 can supply power to the SIM connector 107 without the risk of the SIM card 105 being attached or removed while the communication device 103 is powered. The batteries themselves can hold the SIM card in place, or a separate SIM card latching mechanism (not shown) can be used.

Figure 3:
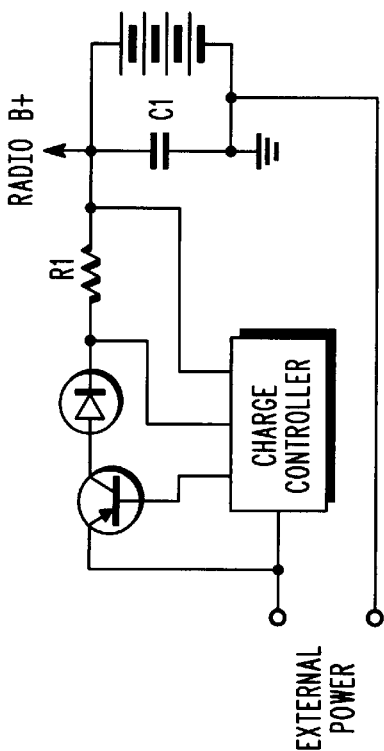
FIG. 3 is a simplified schematic of the charging circuit of the communication device of FIG. 1, in accordance with the present invention.

FIG. 3 shows the charging circuit for the communication device that includes a charge controller circuit and a current control loop. The charge controller circuit provides different operating modes depending on the presence, or lack thereof, of external power and battery power. In addition, the charge controller must provide full-rate and trickle-rate charging capability for the battery. The charge controller circuit contains over voltage protection to accommodate excess or unregulated external power.

The charging circuit includes a current control loop with current limiting. In particular, a PNP pass transistor switch is coupled to a diode to provide a current source controlled by the charge controller. It should be recognized that other current control loop configurations can also be used equally well in the present invention. The charge controller monitors current through a current sense resistor, R1. The charge controller can either operate the pass transistor in a saturated mode or it can use the current source resistor to operate the current control loop in a current regulation mode. During battery charging, these two modes are used for full-rate and trickle-rate charging respectively. In either mode, if the communication device is powered on, and the battery is present, then the battery voltage will be below a threshold value. For a typical application of three 1.4 V battery cells, an outside voltage tolerance limit for the maximum total charge on the batteries is about 5.1 V, 4.2 V being nominal. The communication device controller (117 in FIG. 1) monitors the B+ rail to discriminate between an upper limit on battery voltage (i.e. less than or equal to 5.1 V) and a voltage derived from an external power source.

Figure 4:
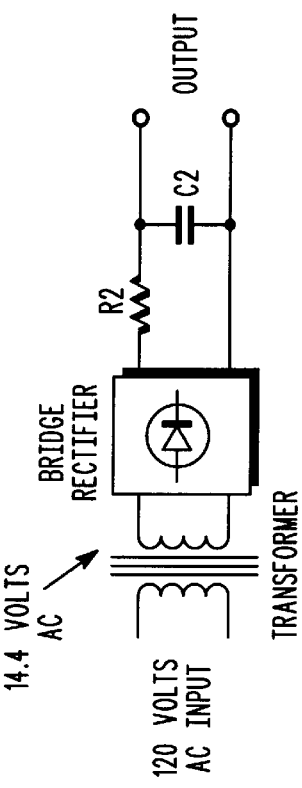
FIG. 4 is a simplified schematic of an external power source that can be used with the charging circuit of FIG. 3.

FIG. 4 shows an external power source for use with the charging circuit of FIG. 3. A transformer is provided to connect to AC mains line voltage and convert it to a secondary voltage of about 14.4 VAC. Preferably, the secondary voltage is much greater than the available battery voltage such that the charging circuit can tolerate variances from the mains voltage or from voltage differences between full-rate and trickle charging. The transformer is fed through a bridge rectifier circuit, as is known in the art. Preferably, a full wave bridge rectifier is used. The transformer is current limited via its effective resistance, R2, which is about 13 ohms. A capacitor, C2, is provided to minimize voltage fluctuations without using regulation, and to limit ripple in the output. In this case a DC output of about 13 volts is provided that will always be higher than a supplied battery voltage in the communication device even where the DC output is unregulated or subject to AC mains voltage fluctuations. The output is connected to the external power input of the charging circuit to charge the battery.

In operation, where the external source is applied to the charging circuit of FIG. 3, and when the battery is not present, then either the transformer will be current limiting or the current control loop through the pass transistor/diode will be current limiting. In either instance, capacitor C1 will charge up until the radio B+ voltage is equal to the transformer voltage minus the voltage drop across the diode junction and the transistor saturation drop. As the voltage from the transformer circuit of FIG. 4 is about 13 V, the B+ voltage will still be significantly about the threshold of 5.1 V even when considering the voltage drops through the current control loop. This will be true even though the transformer circuit is unregulated and subject to mains voltage fluctuations. With the battery present, the voltage available at the radio B+ rail would be no more than 5.1 V. This would be true with either the battery alone or with the external power connected, and under conditions of either trickle-rate or full-rate charging.

In practice, the monitoring of the B+ supply begins shortly after the phone has been powered up. This time is typically about 0.5 seconds. Afterwards, the B+ rail is continually monitored to determine if the voltage is above or below the threshold (5.1 V). Power interruptions of about 0.5 seconds or less are tolerated with no corrective actions. In addition, voltage fluctuations over a single voltage measurement are not acted upon. Several samples are taken or averaged to determine if the B+ voltage has indeed moved through the voltage threshold. Monitoring is done by the communication device controller or a dedicated monitoring circuit.

In a preferred embodiment, charged batteries must be inserted for the phone to operate. If the user cannot power up the phone with batteries alone, then an external charger will need to be connected until the batteries charge up over the threshold. A simple decision table reflecting the various possible conditions is shown below.

TABLE 1

Communication device operability

| Battery present? | SIM card present? | User interface message | Operability |
|---|---|---|---|
| No | No | none | No phone operation |
| No | Yes | none | No phone operation |
| Yes | No | "Check card" | Emergency operation only |
| Yes | Yes | none | Full phone operability |

On power up, the phone (controller) checks for the presence of batteries. If batteries are not present the SIM (if present) is powered down. Preferably, with the battery present and the communication device powered up, the phone can read a SIM card register to check and see if the SIM card is present. This check can be done occasionally, a few seconds or more, to check to see that the SIM card is still present and has not lost connection. If the batteries are present and the SIM is located, then the SIM card is secure. If an external power source (charge, cigarette lighter adapter, handsfree adapter, etc.) is connected to the phone, the phone must continually check for batteries. If at any time the batteries are not present (B+ being over the threshold) then the SIM card is powered down. If no data can be read from the SIM card then this indicates that the card is not present and the display shows a "Check card" message. If battery power is missing the controller can remove power from the SIM connector or preferably the entire phone. It should be recognized that the above power control apparatus and method can be adapted to not only a SIM card but any electronic module that attaches to a communication device and draws power therefrom.

Figure 5:
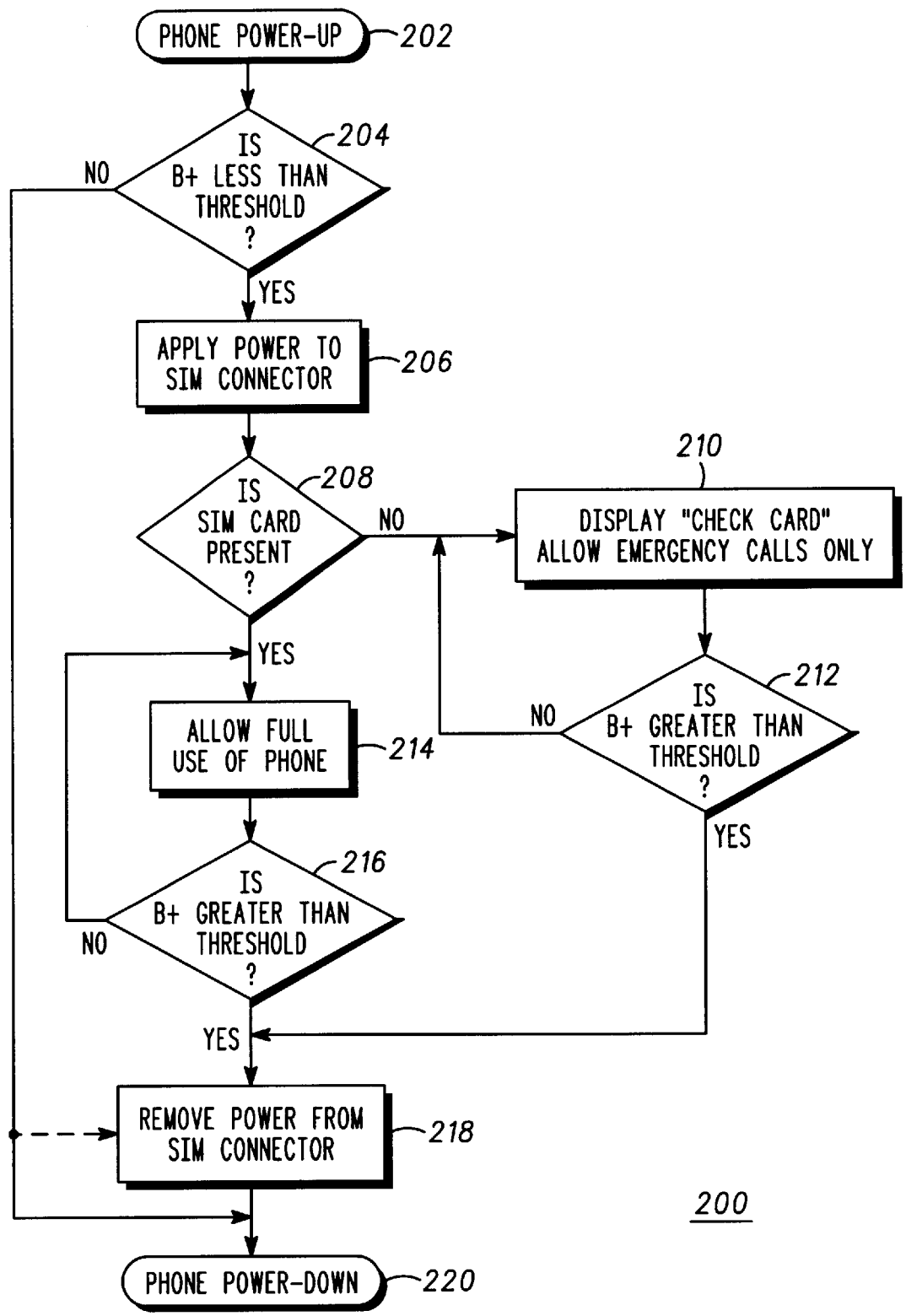
FIG. 5 is a process flow chart of a method in accordance with the present invention.

FIG. 5 is an illustration of a process flow chart that describes a method for controlling power to a SIM card module in a communication device. The process illustrated in FIG. 5 is implemented in software in a microprocessor, such as is commonly available from Motorola, Inc., which is embedded in the controller 117. The process measures voltage on the communication device B+ rail and determined whether an external charge is present. The process determines if the battery is present by measuring the B+ voltage versus a threshold value. If the voltage is too high, the phone will disable power to the SIM card, thus protecting it from latch up or tampering while the phone is operating.

The process 200 begins at 202 when the phone is powered up. The phone proceeds to measure the B+ voltage and compare it to a predetermined threshold value 204. If the B+ voltage is above the threshold, this indicates that only external charger power is present, and the phone shuts down the SIM connector 218 and/or the phone 220. If the B+ voltage is below the threshold, this indicates that only battery power is present, and the phone applies power to the SIM connector 206. The phone then attempts to read a SIM card register to indicate if a SIM card is present 208.

If the SIM card is not present, the phone reverts to emergency only usage 210 and continues to compare the B+ voltage to the threshold 212. As long as B+ remains below the threshold the phone will operate in emergency mode. Alternatively, the phone can occasionally check for SIM presence and continue at block 208. If B+ is greater than the threshold 212, SIM card is disabled 210 and the entire phone is powered down 212.

Once a SIM card is detected 208, the phone proceeds to allow full use of its capabilities. During this time, the phone measures the B+ voltage and compare it to a threshold value 216. If the B+ voltage is below the threshold, this indicates that only battery power is present and the phone continues to provide full, normal operability 214. If the B+ voltage goes above the threshold, this indicates that a charger is now present and the phone disables the SIM card 218.

The above operation can be described as a method for protecting a circuit module in a communication device. A first step in the method is providing a communication device with a user interface and a replaceable SIM card. A next step includes powering up the communication device. A next step includes detecting whether the SIM card is present in the communication device. Preferably, if a SIM card is not detected a SIM card error is indicated. A next step includes measuring the supply voltage to the communication device. A next step includes comparing the supply voltage to a predetermined threshold. When the supply voltage is below the threshold, a next step includes supplying normal functionality to the phone and returning to the comparing step. When the supply voltage is above the threshold, a next step includes powering down the SIM card to limit functionality of the communication device. As the powering down step is indicative of missing battery power it is preferred that the user interface reflect this problem.

It is to be understood that the phraseology or terminology employed herein is for the purpose of description and not of limitation. Accordingly, the invention is intended to embrace all such alternatives, modifications, equivalents and variations as fall within the broad scope of the appended claims. Many additional changes and modifications could be made to the invention without departing from the broad scope thereof.

What is claimed is:

1. A method for protecting an electronic circuit module in a communication device, comprising the steps of:
   providing a communication device adapted to receive a replaceable Subscriber Identification Module (SIM) card;
   powering up the communication device;
   detecting whether a SIM card is present in the communication device;
   measuring a supply voltage to the communication device;
   comparing the supply voltage to a predetermined threshold voltage; and
   when the supply voltage is below the threshold voltage, supplying normal functionality to the phone and returning to the comparing step, and
   when the supply voltage is above the threshold voltage, powering down a connection to the SIM card to limit functionality of the communication device.

2. The method of claim 1, wherein the powering down step includes powering down the communication device.

3. The method of claim 1, wherein the providing step includes a communication device with a user interface, and wherein the detecting step includes indicating a SIM card error on the user interface when the SIM card is not detected.

4. The method of claim 1, wherein the providing step includes a communication device with a user interface, and wherein the powering down step includes indicating a battery problem on the user interface.

5. The method of claim 1, wherein the providing step includes substeps of inserting a SIM card and at least one battery such that the SIM card can not be tampered with after installation of the at least one battery.

6. The method of claim 1, wherein the comparing step includes the predetermined threshold voltage being set at that level of maximum voltage tolerance expected from a fully charged battery source.

7. The method of claim 1, wherein the providing step includes a charging circuit including a charge controller coupled to a current control loop, the charging circuit being adapted to receive power from an external power source, a supply voltage rail to supply power to the communication device, the supply voltage rail being adapted to receive power from a battery source and the charging circuit, and a controller being coupled to the supply voltage rail, the controller operable in the comparing step to compare the voltage on the supply voltage rail with a predetermined threshold voltage.

8. The method of claim 7, wherein the providing step includes the current control loop having a pass transistor switch coupled to a diode and a current sense resistor, and further comprising the steps of operating the pass transistor in a saturated mode to provide full rate charging to a battery, and monitoring the current through the current sense resistor to provide trickle-rate charging to a battery.

9. The method of claim 1, wherein the providing step includes the charging circuit being adapted to receive power from the external power source that has a voltage which is significantly higher than a voltage available from a battery such that the external power source can be unregulated and the charging circuit can accommodate power fluctuations from the external power source without the voltage from the external power source falling below the voltage of the battery during the measuring and comparing steps.

10. An apparatus for protecting an electronic circuit module in a communication device, comprising:
- a charging circuit including a charge controller coupled to a current control loop, the charging circuit being adapted to receive power from an external power source
- a supply voltage rail to supply power to the communication device, the supply voltage rail being adapted to receive power from a battery source and the charging circuit; and
- a controller being coupled to the supply voltage rail, the controller to compare the voltage on the supply voltage rail with a predetermined threshold voltage such that:
  - if the supply voltage is below the threshold voltage, the controller allows normal operation of the communication device phone, and
  - if the supply voltage is above the threshold voltage, the controller powers down a Subscriber Identification Module (SIM) card connection of the communication device to limit functionality of the communication device.

11. The apparatus of claim 10, wherein the current control loop includes a pass transistor switch coupled to a diode and a current sense resistor, wherein the charge controller can operate the pass transistor in a saturated mode to provide full rate charging to a battery, and the charge controller can monitor the current through the current sense resistor to provide trickle-rate charging to a battery.

12. The apparatus of claim 11, wherein the current control loop is coupled to a capacitor connected across battery connection terminals so as to minimize voltage fluctuations on the supply voltage rail.

13. The apparatus of claim 10, wherein the charging circuit is adapted to receive power from the external power source that has a voltage which is significantly higher than a voltage available from a battery such that the external power source can be unregulated and the charging circuit can accommodate power fluctuations from the external power source without the voltage from the external power source falling below the voltage of the battery.

14. The apparatus of claim 10, wherein the predetermined threshold voltage is set at that level of maximum voltage tolerance expected from a fully charged battery source.

15. The apparatus of claim 10, wherein if the supply voltage is above the threshold voltage, the controller powers down the communication device.

16. The apparatus of claim 10, wherein the communication device is adapted to receive a SIM card and at least one battery such that the SIM card can not be tampered with after installation of the at least one battery.

17. The apparatus of claim 10, wherein the communication device includes a user interface under control of the controller, the user interface indicates error conditions to a user when at least one of the battery and SIM card are not detected.

* * * * *